United States Patent
Koga et al.

(10) Patent No.: US 8,223,132 B2
(45) Date of Patent: Jul. 17, 2012

(54) CAPACITIVE TOUCH PAD APPARATUS

(75) Inventors: Issei Koga, Neyagawa (JP); Noriyuki Machida, Tokyo (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 379 days.

(21) Appl. No.: 12/561,232

(22) Filed: Sep. 16, 2009

(65) Prior Publication Data

US 2010/0071966 A1 Mar. 25, 2010

(30) Foreign Application Priority Data

Sep. 17, 2008 (JP) ................................. 2008-237320

(51) Int. Cl.
G06F 3/044 (2006.01)
(52) U.S. Cl. ........................................................ 345/173
(58) Field of Classification Search ........................ None
See application file for complete search history.

(56) References Cited

U.S. PATENT DOCUMENTS

| | | | | |
|---|---|---|---|---|
| 7,995,041 B2 * | 8/2011 | Chang | ............................ | 345/173 |
| 2006/0097991 A1 * | 5/2006 | Hotelling et al. | ............. | 345/173 |
| 2010/0309145 A1 * | 12/2010 | Chiang et al. | ................. | 345/173 |
| 2010/0321327 A1 * | 12/2010 | Liu | ................................ | 345/174 |

FOREIGN PATENT DOCUMENTS

| | | |
|---|---|---|
| JP | 5859115 | 4/1983 |
| JP | 6294521 | 6/1987 |
| JP | 2005-084982 A | 3/2005 |

OTHER PUBLICATIONS

Fig. 7 US 2006/0097991.*

* cited by examiner

Primary Examiner — Van Chow
(74) Attorney, Agent, or Firm — NDQ&M Watchstone LLP

(57) ABSTRACT

Electrodes E1 and E2 are formed on a substrate SB1. Electrodes E3 to E10 are formed on the substrate SB1 to surround the electrodes E1 and E2. Conductive lines L1 and L2 extend over the substrate SB1 to sandwich the electrodes E6 and E7, and are connected to the electrodes E1 and E2. An insulating sheet, having a surface exposed to outside, covers the electrodes E1 to E10 and conductive lines L1 to L10. When a finger contacts the insulating sheet, if there are the electrodes E1 and E2 on a bottom side of a contact portion, capacitances of the electrical conductors EC1 and EC2 are changed. When the finger contacts the insulating sheet, if there are the electrodes E7 and the conductive line L1 that extends in the vicinity thereof on the bottom side of the contact portion, capacitances of the electrical conductors EC7 and EC1 are changed.

12 Claims, 12 Drawing Sheets

FIG.3
(A)
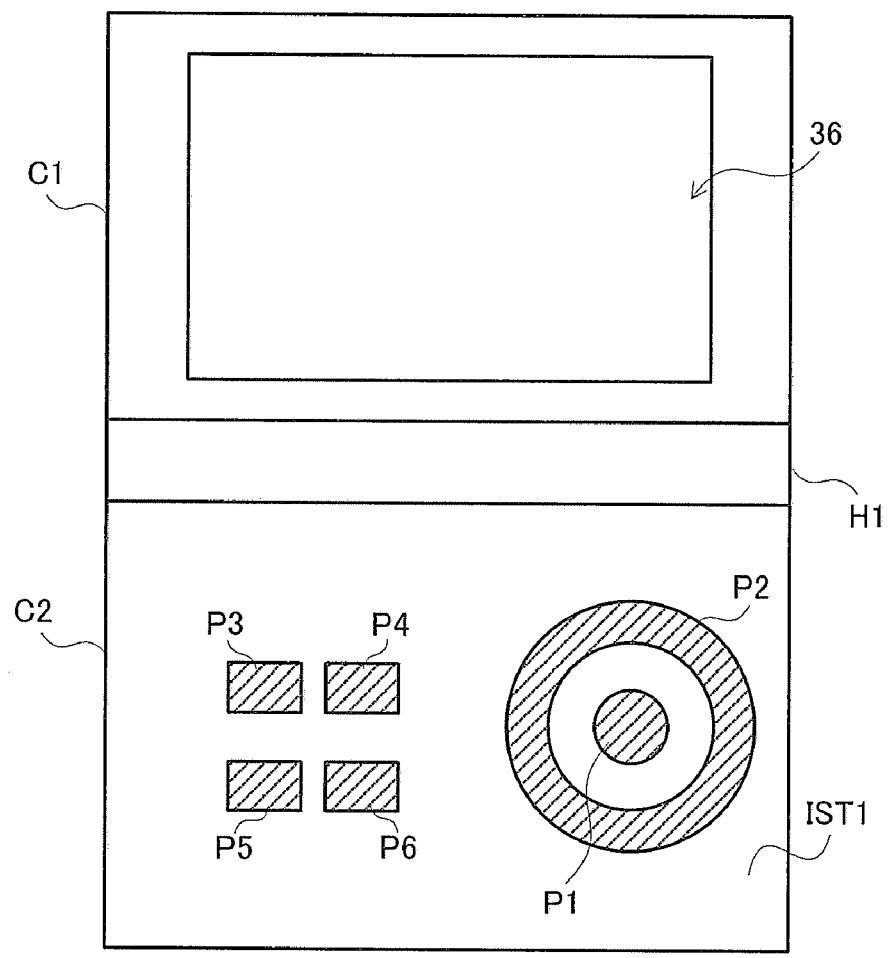
(B)
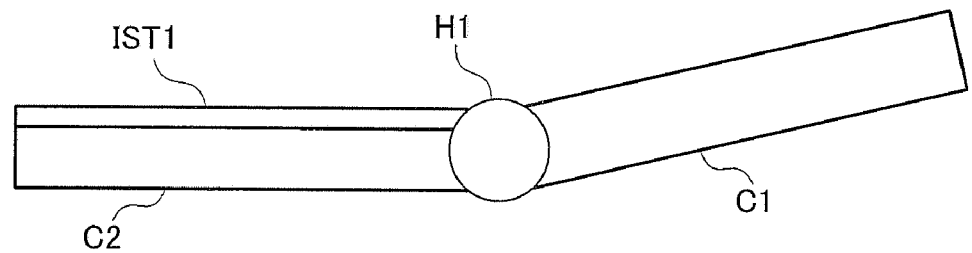

FIG.5
(A)
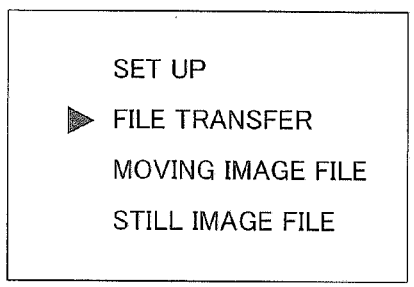
(B)
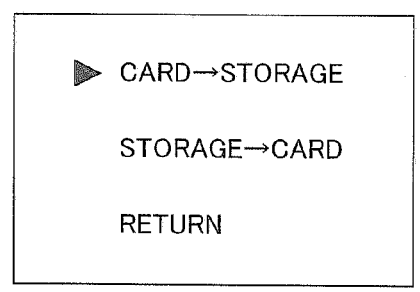
FIG.6
(A)
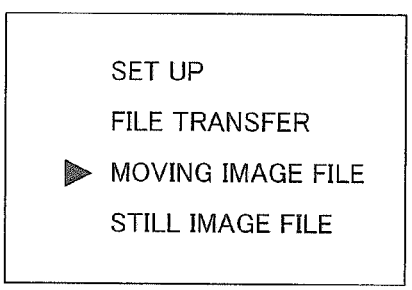
(B)
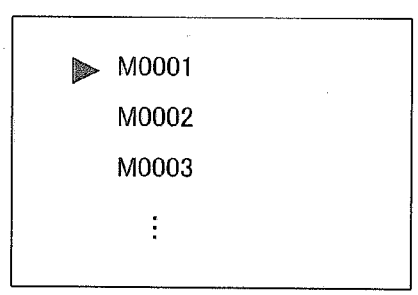
FIG.7
(A)
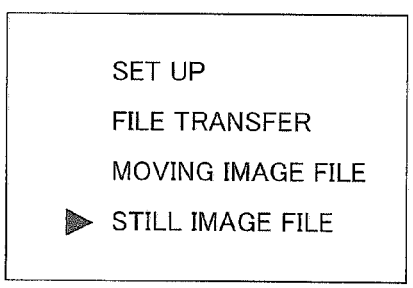
(B)
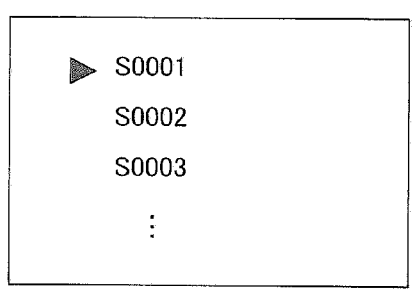

FIG.8

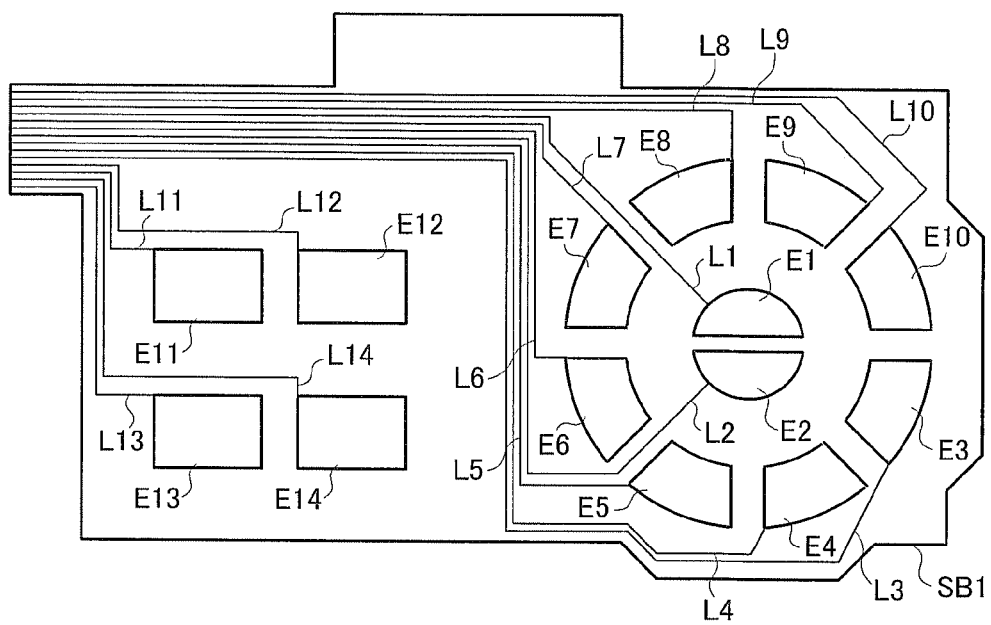

ELECTRICAL CONDUCTOR EC1: ELECTRODE E1+CONDUCTIVE LINE L1
ELECTRICAL CONDUCTOR EC2: ELECTRODE E2+CONDUCTIVE LINE L2
ELECTRICAL CONDUCTOR EC3: ELECTRODE E3+CONDUCTIVE LINE L3
ELECTRICAL CONDUCTOR EC4: ELECTRODE E4+CONDUCTIVE LINE L4
ELECTRICAL CONDUCTOR EC5: ELECTRODE E5+CONDUCTIVE LINE L5
ELECTRICAL CONDUCTOR EC6: ELECTRODE E6+CONDUCTIVE LINE L6
ELECTRICAL CONDUCTOR EC7: ELECTRODE E7+CONDUCTIVE LINE L7
ELECTRICAL CONDUCTOR EC8: ELECTRODE E8+CONDUCTIVE LINE L8
ELECTRICAL CONDUCTOR EC9: ELECTRODE E9+CONDUCTIVE LINE L9
ELECTRICAL CONDUCTOR EC10: ELECTRODE E10+CONDUCTIVE LINE L10
ELECTRICAL CONDUCTOR EC11: ELECTRODE E11+CONDUCTIVE LINE L11
ELECTRICAL CONDUCTOR EC12: ELECTRODE E12+CONDUCTIVE LINE L12
ELECTRICAL CONDUCTOR EC13: ELECTRODE E13+CONDUCTIVE LINE L13
ELECTRICAL CONDUCTOR EC14: ELECTRODE E14+CONDUCTIVE LINE L14

FIG.11
(A) NON-CONTACT STATE
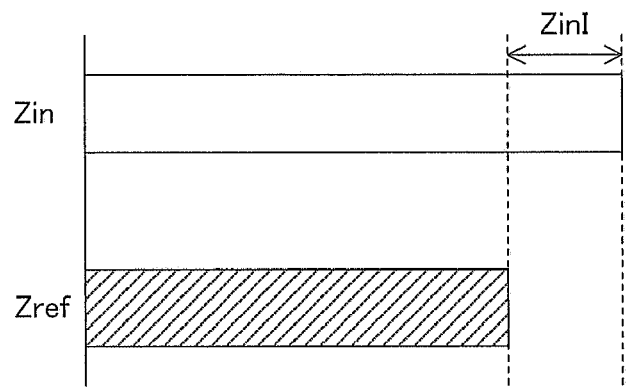
(B) CONTACT STATE
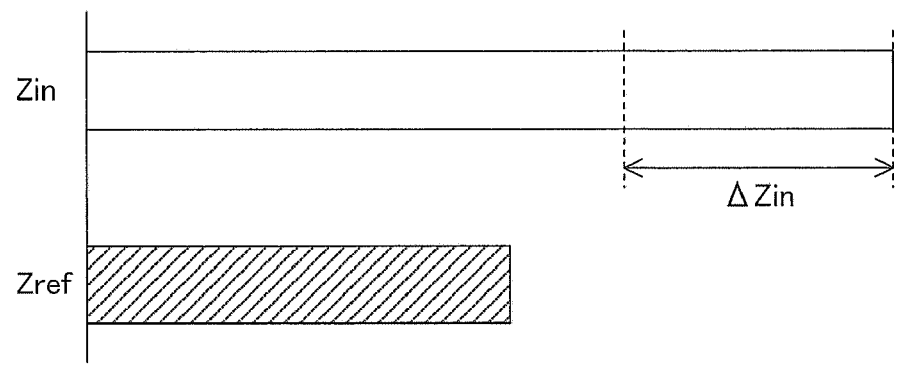

CAPACITIVE TOUCH PAD APPARATUS

CROSS REFERENCE OF RELATED APPLICATION

The disclosure of Japanese Patent-Application No. 2008-237320, which was filed on Sep. 17, 2008, is incorporated herein by reference.

BACKGROUND OF THE INVENTION

1. Field of the Invention

The present invention relates to a capacitive touch pad apparatus. More particularly, the present invention relates to a capacitive touch pad apparatus for sensing a finger contact with an insulating sheet covering an electrode by noticing a change in capacitance between the electrode and the finger.

2. Description of the Related Art

According to one example of this type of an apparatus, a plurality of switch electrodes are placed on a panel and are further covered by a glass plate (or an acrylic plate). When a finger of an operator contacts the glass plate, a capacitance of a switch electrode positioned on a bottom side of a contact portion increases. A manner of manipulating on the panel is determined by noticing such a change in capacitance, and a process depending upon a determination result is executed by a CPU.

However, in the above-described apparatus, a lead pattern connected to a switch electrode is formed near another switch electrode. Thus, a contact by the finger of an operator increases a capacitance of the lead pattern, and there is a possibility that the manner of manipulating may be erroneously determined.

SUMMARY OF THE INVENTION

A capacitive touch pad apparatus according to the present invention comprises: a plurality of first electrodes formed on a substrate; a plurality of second electrodes formed on said substrate in such a manner as to surround the plurality of first electrodes; a plurality of first conductive lines which extend over the substrate in such a manner as to sandwich at least one of the plurality of second electrodes so as to be connected to the plurality of first electrodes, respectively; and an insulating sheet, having one primary surface exposed to outside, for covering the plurality of first electrodes, the plurality of second electrodes, and the plurality of first conductive lines.

Preferably, further comprised is a plurality of second conductive lines which extend over the substrate so as to be connected to the plurality of second electrodes, respectively, wherein the insulating sheet father covers the plurality of second conductive lines.

More preferably, further comprised are: a detector for detecting a change in capacitance of each of the plurality of first electrodes and the plurality of second electrodes; and a processor for executing a process that is referred to a plurality of detection results by the detector.

Preferably, the detector detects a change in the capacitance by comparing a change amount of an input impedance indicating a numerical value corresponding to the capacitance with a threshold value.

Preferably, the detector detects a change in the capacitance by comparing an input impedance indicating a numerical value corresponding to the capacitance with a reference impedance.

Preferably, the detection results of the detector indicate one of active and negative, and the processor includes a determiner for determining whether or not both detection results, out of a plurality of detection results by the detector, corresponding to the plurality of first electrodes are active, a first predetermined process executor for executing a first predetermined process when a determination result of the determiner is affirmative, and a second predetermined process executor for executing a second predetermined process when the determination result by the determiner is negative.

Preferably, the plurality of second electrodes are formed on the substrate in such a manner as to depict a ring, and the processor includes an assigner for assigning a common parameter to the plurality of second electrodes, and an updater for updating a value of the parameter assigned by the assigner by responding to a detection result, out of the plurality of detection results by the detector, corresponding to the plurality of second electrodes.

More preferably, further comprised is a prohibiter for prohibiting a determining process of the determiner when the number of active detection results, out of the plurality of detection results by the detector, exceeds the number of the first electrodes.

The above described features and advantages of the present invention will become more apparent from the following detailed description of the embodiment when taken in conjunction with the accompanying drawings.

BRIEF DESCRIPTION OF THE DRAWINGS

FIG. 3(A) is an illustrative view showing one portion of an appearance of the embodiment in FIG. 1;

FIG. 3(B) is an illustrative view showing another portion of the appearance of the embodiment in FIG. 1;

FIG. 5(A) is an illustrative view showing another example of the menu displayed on the screen;

FIG. 5(B) is an illustrative view showing still another example of the menu displayed on the screen;

FIG. 6(A) is an illustrative view showing yet still another example of the menu displayed on the screen;

FIG. 6(B) is an illustrative view showing another example of the menu displayed on the screen;

FIG. 7(A) is an illustrative view showing still another example of the menu displayed on the screen;

FIG. 7(B) is an illustrative view showing yet still another example of the menu displayed on the screen;

FIG. 8 is an illustrative view showing one example of a printed-circuit board applied to the embodiment in FIG. 1;

FIG. 11(A) is an illustrative view showing one portion of an operation of the decoder in a state that a finger does not contact a touch pad;

FIG. 11(B) is an illustrative view showing one portion of an operation of the decoder in a state that the finger contacts the touch pad;

DETAILED DESCRIPTION OF THE PREFERRED EMBODIMENTS

Figure 1:
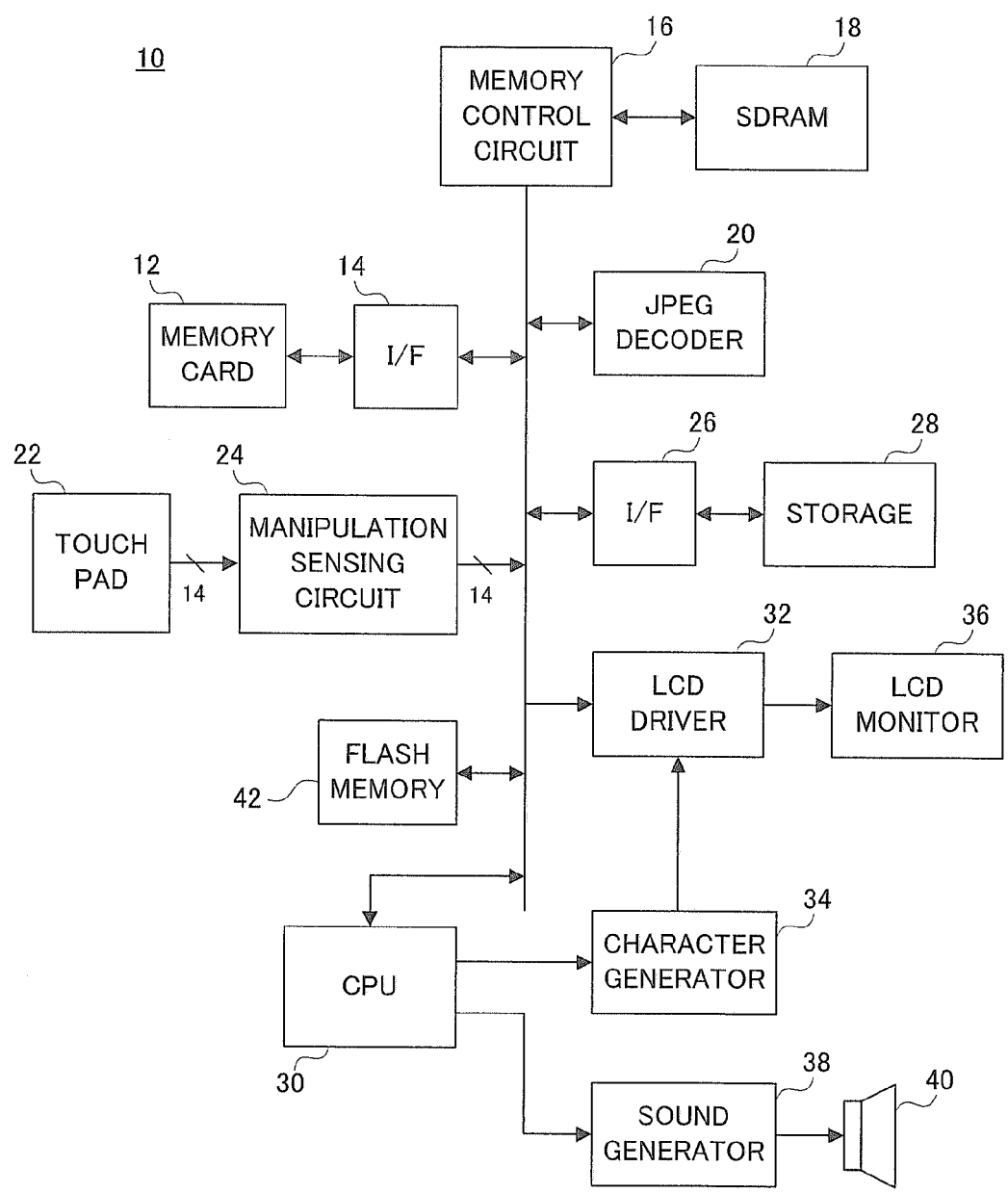
FIG. 1 is a block diagram showing a configuration of one embodiment of the present invention.

With reference to FIG. 1, a photo viewer 10 according to this embodiment includes a capacitive touch pad (hereinafter, briefly referred to as a "touch pad") 22. A manner of manipulating on the touch pad 22 is sensed by a manipulation sensing circuit 24. A CPU 30 repeatedly fetches a sense result of the manipulation sensing circuit 24 and executes a process corresponding to the fetched sense result.

Figure 2:
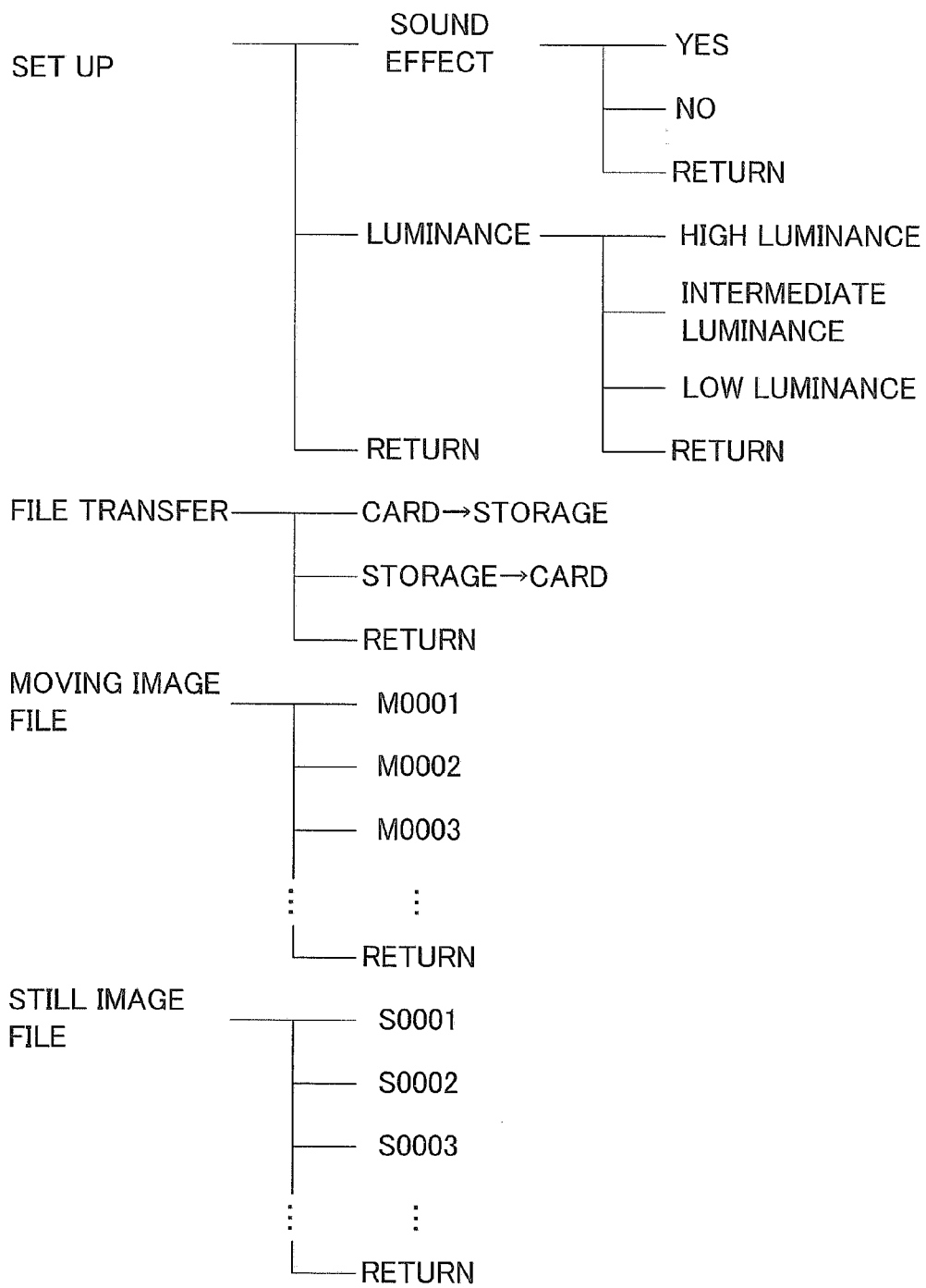
FIG. 2 is an illustrative view showing one example of a hierarchical structure of a menu applied to the embodiment in FIG. 1.

A manipulation menu has a hierarchical structure as shown in FIG. 2. A main menu has four items such as a "set up", a "file transfer", a "moving image file", and a "still image file". A sub menu at a lower hierarchy of the "set up" has three items such as a "sound effect", a "luminance", and a "return". Moreover, a sub menu at a lower hierarchy of the "sound effect" has three items such as "YES", "NO", and a "return", and a sub menu at a lower hierarchy of the "luminance" has four items such as a "high luminance", an "intermediate luminance", a "low luminance", and a "return".

A sub menu at a lower hierarchy of the "file transfer" has three items such as "card→storage", "storage→card", and a "return". A sub menu at a lower hierarchy of the "moving image file" has items such as "M0001", "M0002", "M0003", . . . , and a "return". A sub menu at a lower hierarchy of the "still image file" has items such as "S0001", "S0002", "S0003", . . . , and a "return".

Herein, the item "sound effect" arranged at a lower hierarchy of the "set up" is an item for selecting whether or not a sound effect should be outputted from a speaker 40 in response to the manipulation of the touch pad 22 by an operator. When "YES" is selected, a sound generator 34 is started, and thereby, the sound effect is outputted from the speaker 40 at each touch manipulation. On the other hand, when "NO" is selected, the sound generator 34 is stopped, and thereby, the output of the sound effect from the speaker 40 is stopped.

The item "luminance" arranged at a lower hierarchy of the "set up" is an item for adjusting a brightness of an image displayed on an LCD monitor 36. When the "high luminance" is selected, an LCD driver 32 is set to a high luminance, and then, the brightness of the image displayed on the LCD monitor 36 is increased. When the "intermediate luminance" is selected, the LCD driver 32 is set to an intermediate luminance, and then, the brightness of the image displayed on the LCD monitor 36 becomes moderate. When the "low luminance" is selected, the LCD driver 32 is set to a low luminance, and then, the brightness of the image displayed on the LCD monitor 36 is decreased.

The "file transfer" is an item for instructing a file transfer between: a memory card 12 detachably attached to an I/F 14; and an internal storage 28. When the "card storage" is selected, a moving image file and/or a still image file accommodated in the memory card 12 is transferred to the storage 28. When the "storage-card" is selected, the moving image file and/or the still image file accommodated in the storage 28 is transferred to the memory card 12.

The "moving image file" is an item for selecting a moving image file to be reproduced, out of a plurality of moving image files accommodated in the storage 28. "M0001", "M0002", "M0003", . . . are all file names of the moving image files. When any one of these is selected, a moving image file having the selected file name is reproduced.

The "still image file" is an item for selecting a still image file to be reproduced, out of a plurality of still image files accommodated in the storage 28. "S0001", "S0002", "S0003", . . . are all file names of the still image files, and when any one of these is selected, a still image file having the selected file name is reproduced.

It is noted that in this embodiment, compressed moving image data compressed by a Motion JPEG system is contained in the moving image file, and compressed still image data compressed by a JPEG system is contained in the still image file.

A file transferring operation is executed as follows: When transferring from the memory card 12 to the storage 28, firstly, the I/F 14 reads out the moving image file and/or the still image file from the memory card 12, and writes the read-out moving image file and/or the still image file in an SDRAM 18 through a memory control circuit 16. The moving image file and/or the still image file accommodated in the SDRAM 18 is applied via the memory control circuit 16 to an I/F 26, and the I/F 26 writes the applied file in the storage 28.

On the other hand, when transferring from the storage 28 to the memory card 12, firstly, the I/F 26 reads out the moving image file and/or the still image file from the storage 26, and writes the read-out moving image file and/or the still image file in the SDRAM 18 through the memory control circuit 16. The moving image file and/or the still image file accommodated in the SDRAM 18 is applied via the memory control circuit 16 to the I/F 14, and the I/F 14 writes the applied file in the memory card 12.

A reproducing operation of the moving image file is executed as follows: The compressed moving image data accommodated in a desired moving image file is read out by the I/F 26, and further written in the SDRAM 18 through the memory control circuit 16. A JPEG decoder 20 reads out the compressed moving image data written in the SDRAM 18 through the memory control circuit 16, decompresses the read-out compressed moving image data, and writes the decompressed moving image data in the SDRAM 18 through the memory control circuit 16. The LCD driver 32 reads out the decompressed moving image data thus obtained through the memory control circuit 16, and based on the read-out decompressed moving image data, drives the LCD monitor 36. As a result, the moving image is displayed on a monitor screen. It is noted that the brightness of the displayed moving image complies with the luminance set to the LCD driver 32 as described above.

A reproducing operation of the still image file is executed as follows: The compressed still image data accommodated in a desired still image file is read out by the I/F 26, and further written in the SDRAM 18 through the memory control circuit 16. A JPEG decoder 20 reads out the compressed still image data written in the SDRAM 18 through the memory control circuit 16, decompresses the read-out compressed still image data, and writes the decompressed still image data in the SDRAM 18 through the memory control circuit 16. The LCD driver 32 repeatedly reads out the decompressed still image data thus obtained through the memory control circuit 16, and based on the read-out decompressed still image data, drives the LCD monitor 36. As a result, the still image is displayed on the monitor screen. It is noted that the brightness of the displayed still image also complies with the luminance set to the LCD driver 32 as described above.

With reference to FIG. 3(A) and FIG. 3(B), the photo viewer 10 includes plate-shaped cases C1 and C2 axially supported for rotation by a hinge H1. The LCD monitor 36 is attached to the case C1 in such a manner that its screen is exposed to an inner-side surface of the case C1. The inner-side surface of the case C2 is covered with an insulating sheet IST1. On a top surface of the insulating sheet IST1, a circular determination key P1, a toroidal dial key P2, and strip-shaped function keys P3 to P6 are depicted. By the insulating sheet IST1 and a printed-circuit board PCB1 (described later) shown in FIG. 8 arranged on a bottom surface of the insulating sheet IST1, the touch pad 22 is formed.

Hereinafter, the function keys P3, P4, P5, and P6 are equivalent to keys for directly selecting the "set up", the "file transfer", the "moving image file", and the "still image file". Moreover, the dial key P2 is equivalent to a key for moving a cursor CS that is described later. Furthermore, the determination key P1 is equivalent to a key for selecting an item at which the cursor CS points.

It is noted that each of the determination key P1 and the function keys P3 to P6 has a size about that of an apex of a forefinger of a grown person. A width of a torus formed by the dial key P2 also has a size about that of an apex of a forefinger of a grown person. The cursor CS moves on the screen when the finger slides on the torus formed by the dial key P2.

When power is inputted, the CPU 30 assigns the above-described function or a parameter to the determination key P1, the dial key P2, and the function keys P3 to P6, and requests the character generator 34 to display the main menu and the cursor CS.

Figure 4:
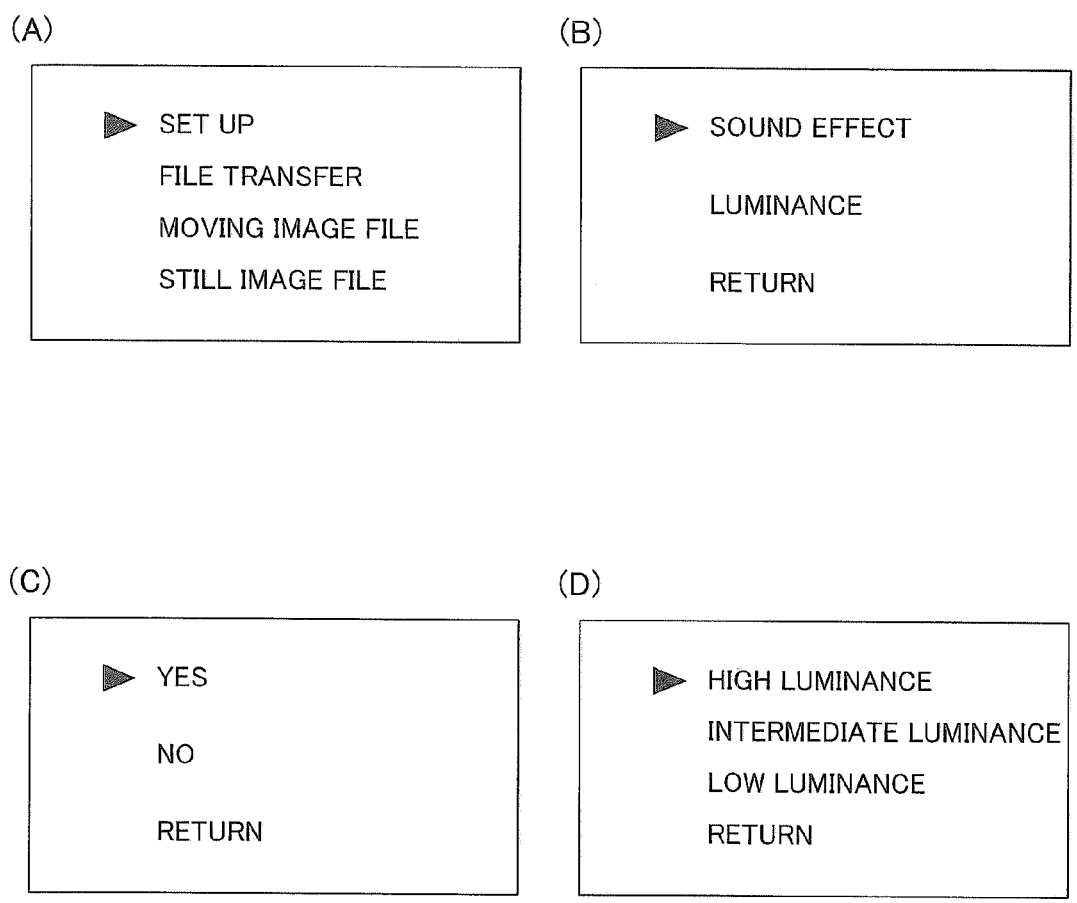
FIG. 4(A) is an illustrative view showing one example of a menu displayed on a screen.
FIG. 4(B) is an illustrative view showing another example of the menu displayed on the screen.
FIG. 4(C) is an illustrative view showing still another example of the menu displayed on the screen.
FIG. 4(D) is an illustrative view showing yet still another example of the menu displayed on the screen.

The character generator 34 applies corresponding character data to the LCD driver 32, and as a result, an image shown in FIG. 4(A) is outputted from the LCD monitor 36. According to FIG. 4(A), the four items of the "setup", the "file transfer", the "moving image file", and the "still image file", and the cursor CS that points at the "set up" are displayed on the screen.

When the finger touches the function key P3, the CPU 30 requests the character generator 34 to display the sub menu existing at a lower hierarchy of the "set up" and the cursor CS. A similar request is issued toward the character generator 34 also when the finger slides on the torus formed by the dial key P2 to adjust the cursor CS to the "set up", and in this state, the finger touches the determination key P1.

As a result, the display on the LCD monitor 36 is transitioned from FIG. 4(A) to FIG. 4(B). According to FIG. 4(B), the three items of the "sound effect", the "brightness", and the "return", and the cursor CS that points at the "sound effect" are displayed on the screen.

When the determination key P1 is touched in a state that the cursor CS is adjusted to the "sound effect" by the dial key P2, the CPU 30 requests character generator 34 to display the sub menu existing at a lower hierarchy of the "sound effect" and the cursor CS. The display on the LCD monitor 36 is transitioned from FIG. 4(B) to FIG. 4(C). According to FIG. 4(C), the three items of the "YES", the "NO", and the "return", and the cursor CS that points at the "YES" are displayed on the screen.

Herein, when the cursor CS is adjusted to "YES" by the dial key P2 and the determination key P1 is touched, the sound generator 38 is started by the CPU 30. On the other hand, when the cursor CS is adjusted to "NO" by the dial key P2 and the determination key P1 is touched, the sound generator 38 is stopped by the CPU 30.

When the cursor CS is adjusted to the "brightness" by the dial key P2 on a screen shown in FIG. 4(B) and the determination key P1 is touched, the CPU 30 requests the character generator 34 to display the sub menu existing at a lower hierarchy of the "brightness" and the cursor CS. The display on the LCD monitor 36 is transitioned from FIG. 4(B) to FIG. 4(D). According to FIG. 4(D), the four items of the "high luminance", the "intermediate luminance", the "low luminance", and the "return", and the cursor CS that points at the "high luminance" are displayed on the screen.

Herein, when the cursor CS is adjusted to the "high luminance" by the dial key P2 and the determination key P1 is touched, the high luminance is set to the LCD driver 32. Moreover, when the cursor CS is adjusted to the "intermediate luminance" by the dial key P2 and the determination key P1 is touched, the intermediate luminance is set to the LCD driver 32. Furthermore, when the cursor CS is adjusted to the "low luminance" by the dial key P2 and the determination key P1 is touched, the low luminance is set to the LCD driver 32.

It is noted that on a screen shown in FIG. 4(B), FIG. 4(C), or FIG. 4(D), when the cursor CS is adjusted to the "return" by the dial key P2, and the determination key P1 is touched, the CPU 30 requests the character generator 34 to display the main menu and the cursor CS. As a result, the screen display is returned to FIG. 4(A).

When the function key P4 is touched in a state that the main menu is displayed, or the cursor CS is adjusted to the "file transfer" by the dial key P2 and the determination key P1 is touched, the CPU 30 requests the character generator 34 to display the sub menu existing at a lower hierarchy of the "file transfer" and the cursor CS. As a result, the display on the LCD monitor 36 is transitioned from FIG. 5(A) to FIG. 5(B). According to FIG. 5(B), the three items of "card→storage", "storage→card", and "return" and the cursor CS that points at "card→storage" are displayed on the screen.

Herein, when the cursor CS is adjusted to "card-storage" by the dial key P2 and the determination key P1 is touched, the moving image file and/or the still image file accommodated in the memory card 12 is transferred to the storage 28. On the other hand, when the cursor CS is adjusted to "storage→card" by the dial key P2 and the determination key P1 is touched, the moving image file and/or the still image file accommodated in the storage 28 is transferred to the memory card 12.

When the function key P5 is touched in a state that the main menu is displayed, or the cursor CS is adjusted to the "moving image file" by the dial key P2 and the determination key P1 is touched, the CPU 30 requests the character generator 34 to display the sub menu existing at a lower hierarchy of the "moving image file" and the cursor CS. As a result, the display on the LCD monitor 36 is transitioned from FIG. 6(A) to FIG. 6(B). According to FIG. 6(B), the items of "M0001", "M0002", "M0003", . . . , and the cursor CS that points at "M0001" are displayed on the screen.

Herein, when the cursor is adjusted to a desired file name by the dial key P2 and the determination key P1 is touched, the compressed moving image data accommodated in a moving image file having a file name at which the cursor CS points is reproduced, and a desired moving image is outputted from the LCD monitor 36. The screen display is returned to FIG. 6(B) when the determination key P1 is touched again.

When the function key P6 is touched in a state that the main menu is displayed, or the cursor CS is adjusted to the "still image file" by the dial key P2 and the determination key P1 is touched, the CPU 30 requests the character generator 34 to display the sub menu existing at a lower hierarchy of the "still image file" and the cursor CS. As a result, the display on the LCD monitor 36 is transitioned from FIG. 7(A) to FIG. 7(B).

According to FIG. 7(B), the items of "S0001", "S0002", "S0003", . . . , and the cursor CS that points at "S0001" are displayed on the screen.

Herein, when the cursor is adjusted to a desired file name by the dial key P2 and the determination key P1 is touched, the compressed still image data accommodated in a still image file having a file name at which the cursor CS points is reproduced, and a desired still image is outputted from the LCD monitor 36. The screen display is returned to FIG. 7(B) when the determination key P1 is touched again.

It is noted that the image shown in FIG. 6(B) or FIG. 7(B) is scrolled when an undisplayed file name is displayed. When the item of "return" is displayed by this scrolling and the determination key P1 is touched in a state that the cursor CS points at "return", the screen display is returned to FIG. 6(A) or FIG. 7(A).

With reference to FIG. 8, the printed-circuit board PCB1 includes 14 electrodes E1 to E14 printed on a top surface of the substrate SB1. The electrodes E1 and E2 are obtained by printing a circular metal on the substrate SB1 and etching the printed circular metal in a diametrical direction. Also, the electrodes E3 to E10 are obtained by printing a toroidal metal on the substrate SB1 in such a manner as to surround the electrodes E1 and E2 and etching the printed toroidal metal in a radial direction at eight positions spaced at 45 degrees. Moreover, the electrodes E11 to E14 are printed in a strip shape on the substrate SB1 so as to be positioned outside the torus depicted by the electrodes E3 to E10. On the top surface of the substrate SB1, the conductive lines L1 to L14 are also printed. The electrodes E1 to E14 are connected to one ends of the conductive lines L1 to L14, respectively, and the other ends of the conductive lines L1 to L14 reach an end of the substrate SB1.

As a result, an electrical conductor EC1 is formed by the electrode E1 and the conductive line L1; an electrical conductor EC2 is formed by the electrode E2 and the conductive line L2; an electrical conductor EC3 is formed by the electrode E3 and the conductive line L3; an electrical conductor EC4 is formed by the electrode E4 and the conductive line L4; and an electrical conductor EC5 is formed by the electrode E5 and the conductive line L5.

Moreover, an electrical conductor EC6 is formed by the electrode E6 and the conductive line L6; an electrical conductor EC7 is formed by the electrode E7 and the conductive line L7; an electrical conductor EC8 is formed by the electrode E8 and the conductive line L8; an electrical conductor EC9 is formed by the electrode E9 and the conductive line L9; and an electrical conductor EC10 is formed by the electrode E10 and the conductive line L10.

Furthermore, an electrical conductor EC11 is formed by the electrode E11 and the conductive line L11; an electrical conductor EC12 is formed by the electrode E12 and the conductive line L12; an electrical conductor EC13 is formed by the electrode E13 and the conductive line L13; and an electrical conductor EC14 is formed by the electrode E14 and the conductive line L14.

Herein, the conductive line L1 extends into a void between the electrodes E7 and E8 so as to contact neither the electrodes E7 nor E8. Also, the conductive line 12 extends into a void between the electrodes E5 and E6 so as to contact neither the electrodes E5 nor E6. That is, the conductive lines L1 and L2 that need to cross the torus depicted by the electrodes E3 to E10 in order to reach the end of the substrate SB1 extend from inside the toms to outside thereof in such a manner as to sandwich at least one of the electrodes E3 to E10 and not to contact the electrodes E3 to E10.

The insulating sheet LST1 shown in FIG. 3(A) and FIG. 3(B) is stacked on the top surface of the printed-circuit board PCB1. The determination key P1 is depicted in a circular shape at a position to cover the electrodes E1 and E2, the dial key P2 is depicted in a toroidal shape at a position to cover the electrodes E3 to E10, and the function keys P3 to P6 are depicted in a strip shaped at positions respectively to cover the electrodes E11 to E14.

Figure 9:
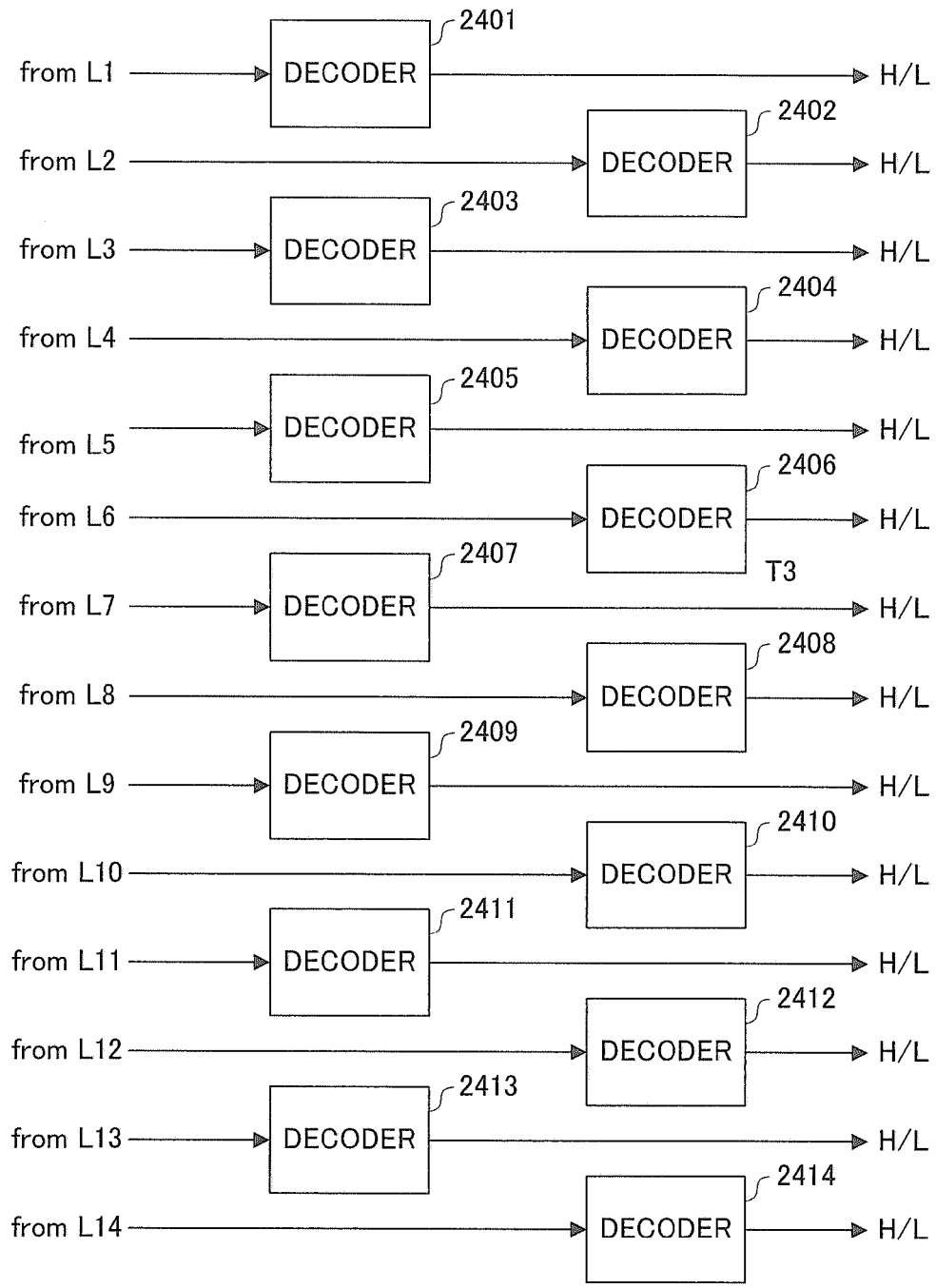
FIG. 9 is a block diagram showing one example of a configuration of a manipulation sensing circuit applied to the embodiment in FIG. 1.

The manipulation sensing circuit 24 is configured as shown in FIG. 9. Capacitances VC1 to VC14 of the electrical conductors EC1 to EC14 are determined by decoders 2401 to 2414, respectively. From each of the decoders 2401 to 2414, a decode value equivalent to "H" or "L" is outputted. It is noted that "H" is equivalent to an active decode value, and "L" is equivalent to a negative decode value.

Figure 10:
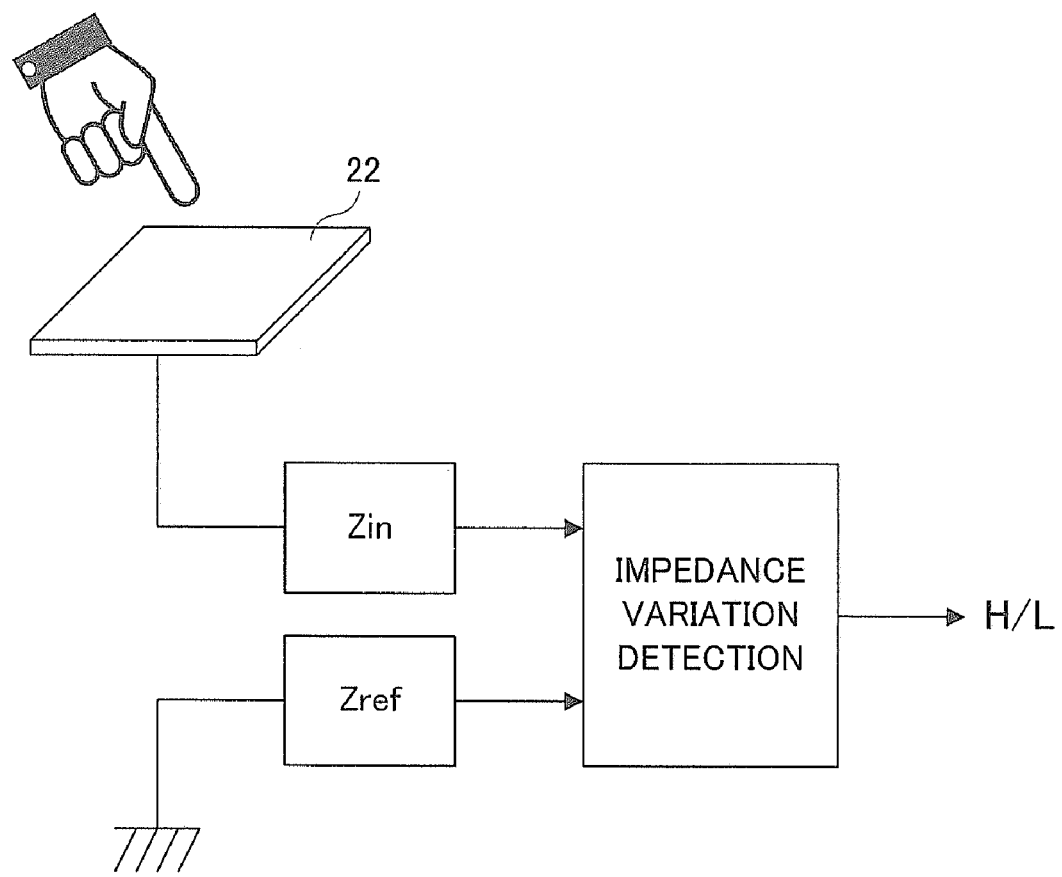
FIG. 10 is an illustrative view showing one portion of an operation of a decoder applied to the embodiment in FIG. 9.

An operation of each of the decoders 2401 to 2414 is described with reference to FIG. 10, FIG. 11(A), and FIG. 11(B). For example, when the finger of the operator comes into contact with the function key P3, the capacitance VC11 of the electrical conductor EC11 is increased. Likewise, when the finger of the operator comes into contact with the determination key P1, the capacitance VC1 of the electrical conductor EC1 and the capacitance VC2 of the electrical conductor EC2 are increased.

An input impedance Zin changes depending on such contact/non-contact of the finger. Due to a design error, there is a disparity between a magnitude of the input impedance Zin in a non-contact state and that of a reference impedance Zref (see FIG. 11(A)). When this disparity is defined as a "difference impedance ZinI", the magnitude of the difference impedance ZinI is stable in a non-contact state, and increases as a time period elapses in a contact state.

When such an increase amount of the a difference impedance ZinI is defined as "ΔZin", output of each of the decoders 2401 to 2414 indicates "L" when the increase amount ΔZin falls below a threshold value TB, and on the other hand, indicates "H" when the increase amount ΔZin is equal to or more than the threshold value TH.

Figure 12:
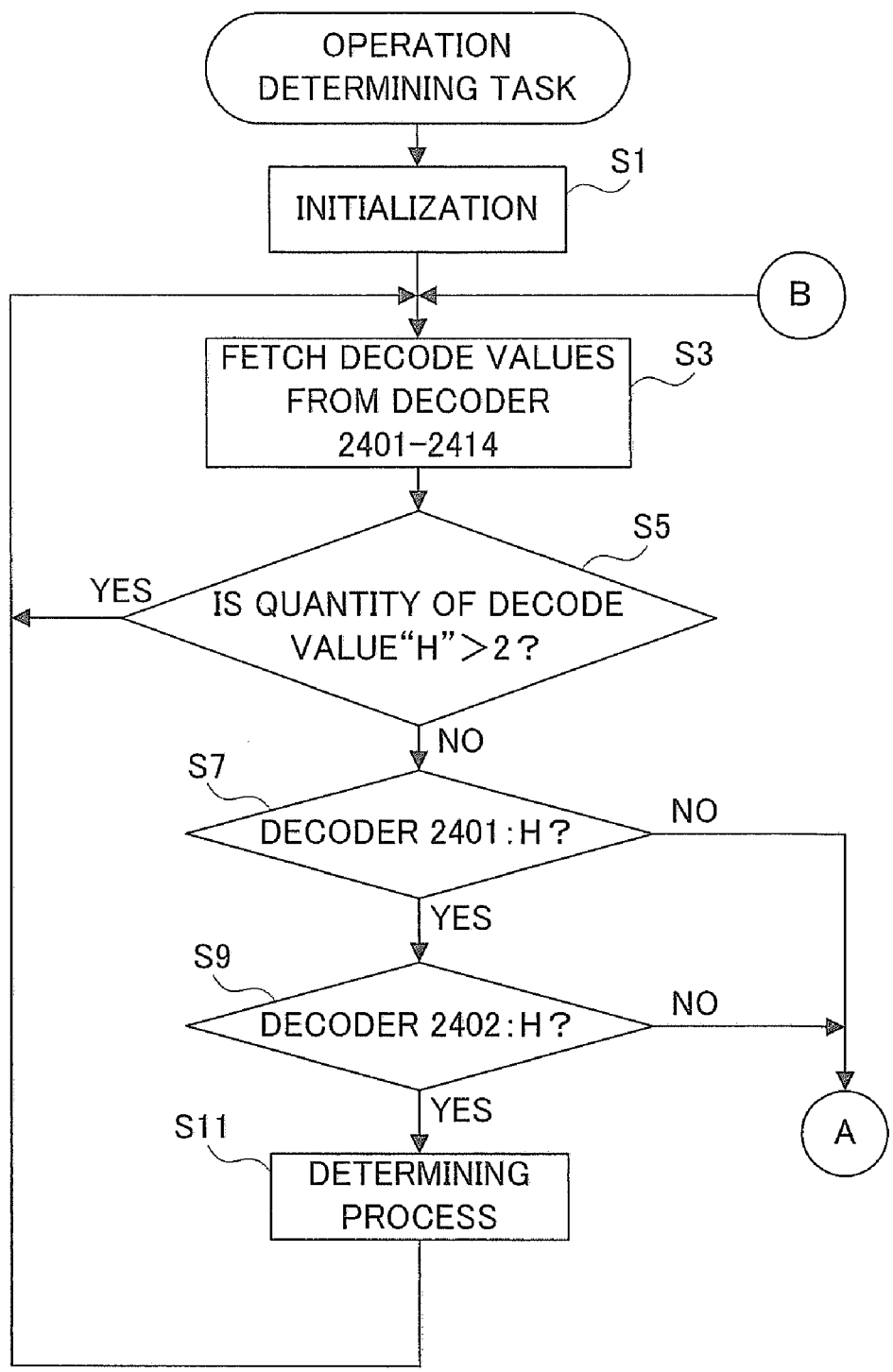
FIG. 12 is a flowchart showing one portion of an operation of a CPU applied to the embodiment in FIG. 1.
Figure 13:
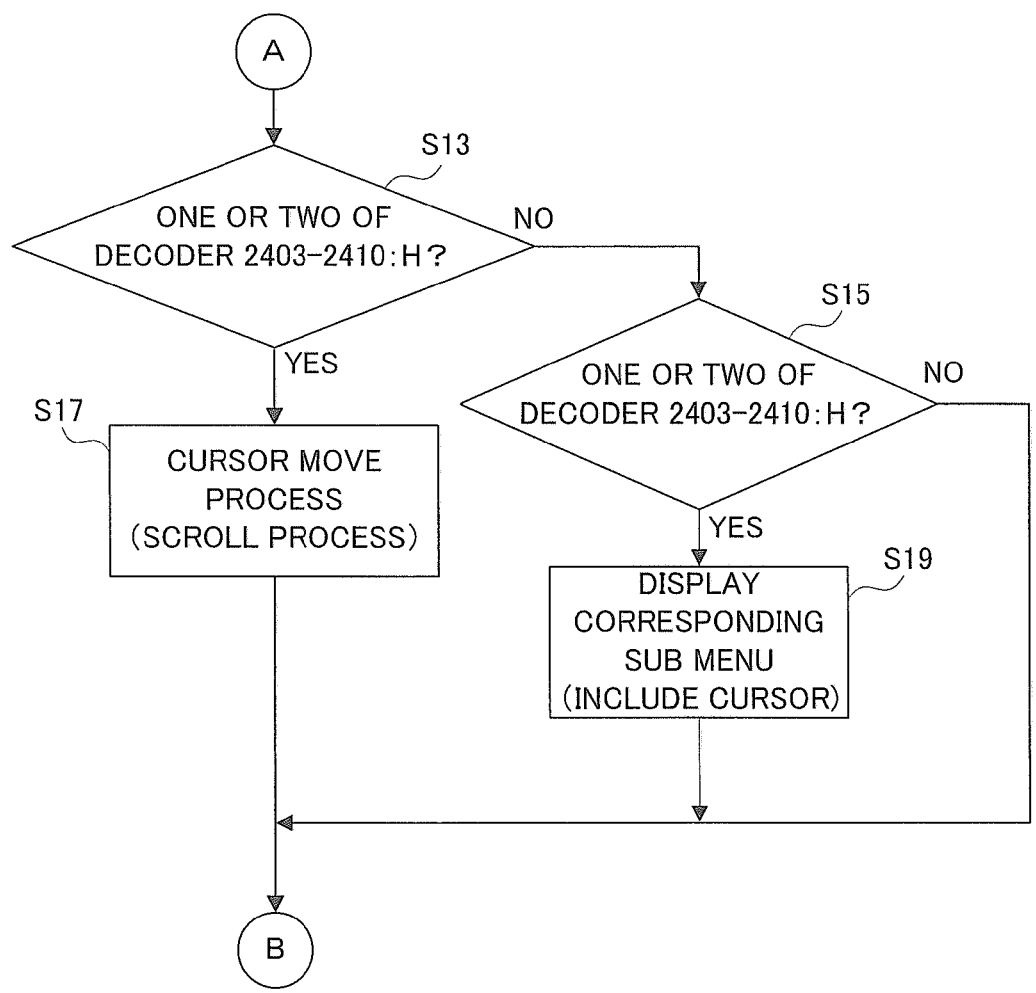
FIG. 13 is a flowchart showing another portion of the operation of the CPU applied to the embodiment in FIG. 1.

The CPU 30 executes a plurality of tasks, including a manipulation determining task shown in FIG. 12 and FIG. 13, in a parallel manner. It is noted that a control program corresponding to these tasks is stored in a flash memory 42.

Firstly, in a step S1, an initializing setting is performed. As a result, the above-described function or parameter is assigned to the determination key P1 (i.e., the electrodes E1 and E2), the dial key P2 (i.e., the electrodes E3 to E10), and the function keys P3 to P6 (i.e., the electrodes E11 to E14), and a display request of the main menu and the cursor CS is issued toward the character generator 34.

In a subsequent step S3, from the decoders 2401 to 2414, a total of 14 decode values are fetched. In a step S5, it is determined whether or not the number of decode values indicating "H", out of the 14 fetched decode values, exceeds "2". When YES is determined, the process directly returns to the step S3 whereas when NO is determined, the process undergoes processes in steps S7 to S19, and then, returns to the step S3. That is, the processes following the step S7 are permitted when the number of decode values indicating "H" is equal to or less than two, and are prohibited when the number of decode values indicating "H" is equal to or more than three.

In the step S7, it is determined whether or not the decode value outputted from the decoder 2401 indicates "H", and in the step S9, it is determined whether or not the decode value outputted from the decoder 2402 indicates "H". When YES is determined in the both steps S7 and S9, a determining process, i.e., a process for selecting an item at which the cursor CS points, is executed in the step S11, and then, the process returns to the step S3.

On the other hand, when NO is determined in the step S7 or S9, it is determined in a step S13 whether or not one or two of the decode values of the decoders 2403 to 2410 indicate "H", and it is determined in a step S15 whether or not one or two of the decode values of the decoders 2411 to 2414 indicate "H". When YES is determined in the step S13, the process advances to a step S17 so as to move the cursor CS in a desired direction or scroll the display items in up and down directions. When YES is determined in the step S15, the display of the corresponding sub menu and the cursor is requested to the character generator 34. Upon completion of the process in the step S17 or S19, or when NO is determined in the both steps S13 and S15, the process returns to the step S3.

As understood from the above description, the electrodes E1 and E2 are formed on the substrate SB1. Moreover, the electrodes E3 to E10 are formed on the substrate SB1 in such a manner as to surround the electrodes E1 and E2. The conductive lines L1 and L2 extend over the substrate SB1 in such a manner as to sandwich electrodes E6 and E7, and are connected to the electrodes E1 and E2, respectively. The insulating sheet IST1, which has the top surface exposed to outside, covers the electrodes E1 to E10 and the conductive lines L1 to L10.

In a case that the finger of the operator contacts the top surface of the insulating sheet IST1, if there are the electrodes E1 and E2 on the bottom side of the contact portion, the capacitance VC1 of the electrical conductor EC1 and the capacitance VC2 of the electrical conductor EC2 change. Likewise, in a case that the finger of the operator contacts the top surface of the insulating sheet IST1, if there are the electrode E7 and the conductive line L1 extending in the vicinity thereof on the bottom side of the contact portion, the capacitance VC7 of the electrical conductor EC7 and the capacitance VC1 of the electrical conductor EC1 change.

However, in this embodiment, the two electrodes E1 and E2 and the two conductive lines L1 and L2 are prepared, and the conductive lines L1 and L2 extend in such a manner as to sandwich the electrodes E6 and E7. Therefore, when the capacitance VC1 of the electrical conductor EC1 and the capacitance VC2 of the electrical conductor EC2 are individually monitored, it becomes clear whether the change of the capacitance VC1 results from contacting of the finger with a portion that covers the electrodes E1 and E2 or results from contacting of the finger with a portion that covers the electrode E7 and the conductive line L1 that extends in the vicinity thereof. Thereby, it becomes possible to prevent an erroneous determination of a manner of manipulating.

It is noted that in this embodiment, inside the torus depicted by the electrodes E3 to E10, a pair of electrodes E1 and E2 are formed. However, as in a printed-circuit board PCB2 shown in FIG. 14, two or more pairs of electrodes may be formed inside the torus.

Figure 14:
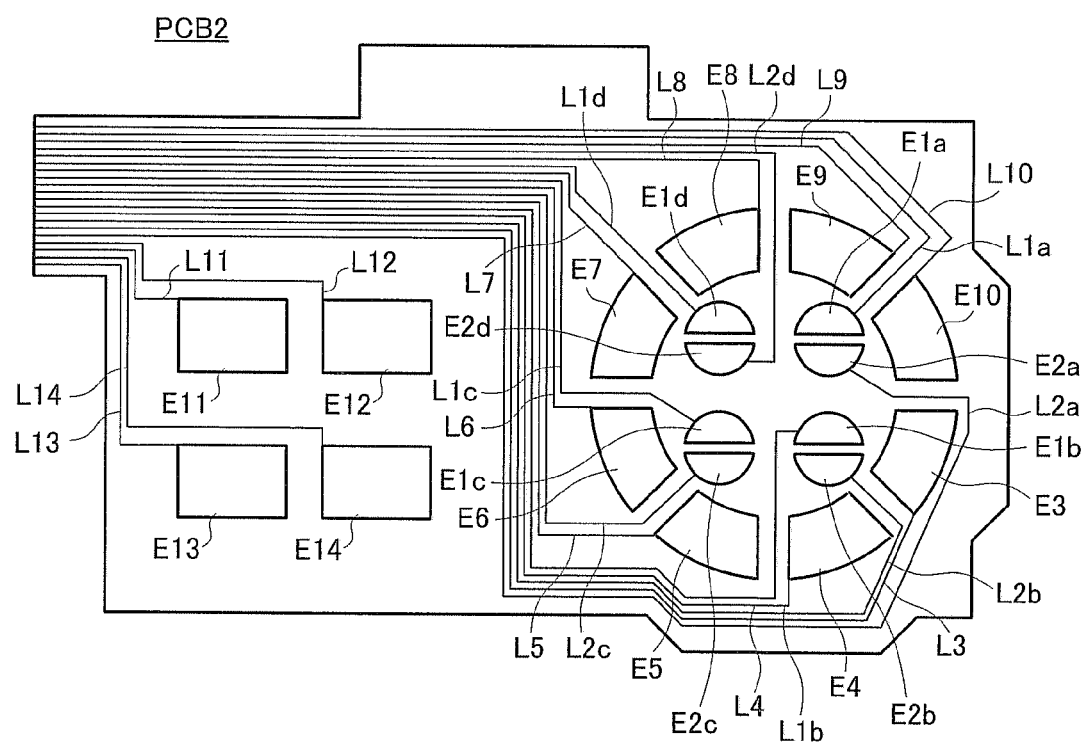
FIG. 14 is an illustrative view showing one example of a printed-circuit board applied to another embodiment.

According to FIG. 14, electrodes E1a and E2a form a pair, and conductive lines L1a and L2a extend from the electrodes E1a and E2a, respectively. Moreover, electrodes E1b and E2b form a pair, and conductive lines L1b and L2b extend from the electrodes E1b and E2b, respectively. Furthermore, electrodes E1c and E2c form a pair, and conductive lines L1c and L2c extend from electrodes E1c and E2c, respectively. Still furthermore, electrodes E1d and E2d form a pair, and conductive lines L1d and L2d extend from the electrodes E1d and E2d, respectively.

Herein, the conductive line L1a extends into a void between the electrodes E9 and E10, and the conductive line L2a extends into a void between the electrodes E10 and E3. Moreover, the conductive line L1b extends into a void between the electrodes E4 and E5, and the conductive line L2b extends into a void between the electrodes E3 and E4. Furthermore, the conductive line L1c extends into a void between the electrodes E6 and E7, and the conductive line L2c extends into a void between the electrodes E5 and E6. Also, the conductive line L1d extends into a void between the electrodes E7 and E8, and the conductive line L2d extends into a void between the electrodes E8 and E9.

Moreover, in this embodiment, the printed-circuit board PCB1 is covered with the single insulating sheet IST1. However, the printed-circuit board PCB1 may be locally covered with a plurality of pieces of divided insulating sheets.

Moreover, in this embodiment, as the parameter assigned to the electrodes E3 to E10, the cursor CS is assumed, and as the parameter value that is modified in response to the touch manipulation on the dial key P2, a position of the cursor CS is assumed. However, as the parameter and its value assigned to the electrodes E3 to E10, a sound effect and its magnitude may be assumed, and an image frame to be reproduced and its position may be assumed.

Also, in this embodiment, as the capacitive touch pad apparatus, the photo viewer is assumed. However, it is needless to say that the present invention may also be applied to apparatuses such as an audio player.

Moreover, according to this embodiment, each of the decoders 2401 to 2414 compares the increase amount $\Delta Zin$ of the difference impedance ZinI with the threshold value TH so as to switch the output between "H" and "L". However, each of the decoders 2401 to 2414 may output "H" when input impedance Zin>reference impedance Zref is established, and on the other hand, may output "L" when input impedance Zin$\leq$reference impedance Zref is established.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A capacitive touch pad apparatus, comprising:
a plurality of first electrodes positioned on a substrate;
a plurality of second electrodes positioned on said substrate so as to substantially encircle at least one of said plurality of first electrodes;
a plurality of first conductive lines extending from at least one of said plurality of first electrodes along said substrate, with at least one of said plurality of first conductive lines positioned between at least two of said plurality of second electrodes;
an insulating sheet, having one primary surface exposed to outside, for covering said plurality of first electrodes, said plurality of second electrodes, and said plurality of first conductive lines
a detector for detecting a change in capacitance of each of said plurality of first electrodes and said plurality of second electrodes; and
a processor for executing a process that is referred to a plurality of detection results by said detector
wherein the detection results of said detector indicate one of active and negative, and said processor includes a determiner for determining whether or not both detection results, out of a plurality of detection results by said detector, corresponding to said plurality of first electrodes are active, a first predetermined process executor for executing a first predetermined process when a determination result of said determiner is affirmative, and a second predetermined process executor for executing a second predetermined process when the determination result by said determiner is negative.

2. A capacitive touch pad apparatus according to claim 1, wherein said plurality of second electrodes are formed on said substrate in such a manner as to depict a ring, and said processor includes an assigner for assigning a common parameter to said plurality of second electrodes, and an updater for updating a value of the parameter assigned by said assigner by responding to a detection result, out of the plurality of detection results by said detector, corresponding to said plurality of second electrodes.

3. A capacitive touch pad apparatus according to claim 2, further comprising a prohibiter for prohibiting a determining process of said determiner when the number of active detection results, out of the plurality of detection results by said detector, exceeds the number of said first electrodes.

4. A capacitive touch pad apparatus according to claim 1, further comprising a prohibiter for prohibiting a determining process of said determiner when the number of active detection results, out of the plurality of detection results by said detector, exceeds the number of said first electrodes.

5. A capacitive touch pad apparatus, comprising:
a plurality of first electrodes positioned on a substrate;
a plurality of second electrodes positioned on said substrate so as to substantially encircle at least one of said plurality of first electrodes;
a plurality of first conductive lines extending from at least one of said plurality of first electrodes along said substrate, with at least one of said plurality of first conductive lines positioned between at least two of said plurality of second electrodes;
an insulating sheet, having one primary surface exposed to outside, for covering said plurality of first electrodes, said plurality of second electrodes, and said plurality of first conductive lines;
a detector for detecting a change in capacitance of each of said plurality of first electrodes and said plurality of second electrodes; and
a processor for executing a process that is referred to a plurality of detection results by said detector;
wherein said detector detects a change in the capacitance by comparing a change amount of an input impedance indicating a numerical value corresponding to the capacitance with a threshold value; and
wherein the detection results of said detector indicate one of active and negative, and said processor includes a determiner for determining whether or not both detection results, out of a plurality of detection results by said detector, corresponding to said plurality of first electrodes are active, a first predetermined process executor for executing a first predetermined process when a determination result of said determiner is affirmative, and a second predetermined process executor for executing a second predetermined process when the determination result by said determiner is negative.

6. A capacitive touch pad apparatus according to claim 5, wherein said plurality of second electrodes are formed on said substrate in such a manner as to depict a ring, and said processor includes an assigner for assigning a common parameter to said plurality of second electrodes, and an updater for updating a value of the parameter assigned by said assigner by responding to a detection result, out of the plurality of detection results by said detector, corresponding to said plurality of second electrodes.

7. A capacitive touch pad apparatus according to claim 6, further comprising a prohibiter for prohibiting a determining process of said determiner when the number of active detection results, out of the plurality of detection results by said detector, exceeds the number of said first electrodes.

8. A capacitive touch pad apparatus according to claim 5, further comprising a prohibiter for prohibiting a determining process of said determiner when the number of active detection results, out of the plurality of detection results by said detector, exceeds the number of said first electrodes.

9. A capacitive touch pad apparatus, comprising:
a plurality of first electrodes positioned on a substrate;
a plurality of second electrodes positioned on said substrate so as to substantially encircle at least one of said plurality of first electrodes;
a plurality of first conductive lines extending from at least one of said plurality of first electrodes along said substrate, with at least one of said plurality of first conductive lines positioned between at least two of said plurality of second electrodes;
an insulating sheet, having one primary surface exposed to outside, for covering said plurality of first electrodes, said plurality of second electrodes, and said plurality of first conductive lines;
a detector for detecting a change in capacitance of each of said plurality of first electrodes and said plurality of second electrodes; and
a processor for executing a process that is referred to a plurality of detection results by said detector;
wherein said detector detects a change in the capacitance by comparing an input impedance indicating a numerical value corresponding to the capacitance with a reference impedance; and
wherein the detection results of said detector indicate one of active and negative, and said processor includes a determiner for determining whether or not both detection results, out of a plurality of detection results by said detector, corresponding to said plurality of first electrodes are active, a first predetermined process executor for executing a first predetermined process when a determination result of said determiner is affirmative, and a second predetermined process executor for executing a second predetermined process when the determination result by said determiner is negative.

10. A capacitive touch pad apparatus according to claim 9, further comprising a prohibiter for prohibiting a determining process of said determiner when the number of active detection results, out of the plurality of detection results by said detector, exceeds the number of said first electrodes.

11. A capacitive touch pad apparatus according to claim 9, wherein said plurality of second electrodes are formed on said substrate in such a manner as to depict a ring, and said processor includes an assigner for assigning a common parameter to said plurality of second electrodes, and an updater for updating a value of the parameter assigned by said assigner by responding to a detection result, out of the plurality of detection results by said detector, corresponding to said plurality of second electrodes.

12. A capacitive touch pad apparatus according to claim 11, further comprising a prohibiter for prohibiting a determining process of said determiner when the number of active detection results, out of the plurality of detection results by said detector, exceeds the number of said first electrodes.

* * * * *